(12) United States Patent
Sands et al.

(10) Patent No.: US 7,404,086 B2
(45) Date of Patent: Jul. 22, 2008

(54) METHOD AND APPARATUS FOR BIOMETRIC AUTHENTICATION

(75) Inventors: Justin M. Sands, Reston, VA (US); Christopher A. Sands, Herndon, VA (US); Arthur J. Sands, Jr., Falls Church, VA (US)

(73) Assignee: AC Technology, Inc., Herndon, VA (US)

( * ) Notice: Subject to any disclaimer, the term of this patent is extended or adjusted under 35 U.S.C. 154(b) by 806 days.

(21) Appl. No.: 10/350,003

(22) Filed: Jan. 24, 2003

(65) Prior Publication Data

US 2004/0148526 A1 Jul. 29, 2004

(51) Int. Cl.
*H04L 9/32* (2006.01)
(52) U.S. Cl. ...................................... 713/186
(58) Field of Classification Search .................. 713/186
See application file for complete search history.

(56) References Cited

U.S. PATENT DOCUMENTS

| | | | | |
|---|---|---|---|---|
| 6,256,737 B1 * | 7/2001 | Bianco et al. | ............... | 713/186 |
| 7,003,670 B2 * | 2/2006 | Heaven et al. | ............... | 713/186 |
| 7,039,812 B2 * | 5/2006 | Kawan et al. | ............... | 713/186 |
| 2002/0174347 A1 * | 11/2002 | Ting | ........................... | 713/186 |
| 2003/0154382 A1 * | 8/2003 | Vicard | ........................ | 713/186 |

* cited by examiner

*Primary Examiner*—Matthew B Smithers
(74) *Attorney, Agent, or Firm*—Bingham McCutchen LLP (57) ABSTRACT

A biometric authentication method and system may be implemented in a client server architecture to provide substantial access control security and ease of administration. Users are enrolled in the system by providing multiple biometric measurements which are stored in a database as part of the user's biometric profile. Upon attempted access of a computer, the biometric authentication engine determines which biometrics are required and what the biometric matching criteria are based on the location of the computer, time of day and other security conditions. If the user is determined not to be authentic, a security policy may cause an action to occur such as revoking the user's access privileges or causing the login attempt to appear to be successful while the authorities are summoned.

57 Claims, 4 Drawing Sheets

METHOD AND APPARATUS FOR BIOMETRIC AUTHENTICATION

FIELD OF THE INVENTION

The present invention relates generally to authentication and, more particularly, to biometric authentication.

BACKGROUND OF THE INVENTION

Security measures are increasingly needed to protect sensitive data and facilities. Only authentic users should have access to such data and facilities. However, simple passwords or even magnetic type security cards that have conventionally been used to authenticate users can be lost, stolen or duplicated. In such cases the missing or duplicated security cards or passwords allows a thief access to secure areas.

In addition to providing security, a security method and apparatus must be relatively simple and easy to use and administer. For example, armed guards can protect stored data and facilities containing such data, but it is impossible to have armed personnel protect all important data and secure facilities. Even if sufficient personnel were available, the question still remains: how can a guard know who should have access?

Today, businesses generally deploy networks, such as local area networks (LANs) or wide area networks (WANs) in order to make valuable information and resources available immediately to trusted employees. Computer networks are thus very powerful and enable employees to work efficiently together. However, the power and convenience of computer networks also makes theft of information easier to accomplish.

In U.S. Pat. No. 6,256,737, it is proposed to implement one or more biometric devices associated with a client computer to read biometric(s) of a user and control access to a computer network. The patent, however, performs authentication and grants access to the network based solely on biometrics of a user and fixed confidence thresholds.

Accordingly, there is a need for security measures that are not easily susceptible to theft and duplication. There is a further need for security measures for accessing computers and computer networks that may be implemented securely and conveniently within an organization. There is still a further need for security measures that are capable of providing variations in authentication procedures based on events that comprise security risks.

SUMMARY OF THE INVENTION

According to the present invention, a biometric authentication method and system may be implemented in a client server architecture to provide substantial access control security and ease of administration. Users are enrolled in the system by providing multiple biometric measurements which are stored in a database as part of the user's biometric profile.

Upon attempted access of a resource, a biometric authentication engine determines which biometrics are required and what biometric matching criteria are required, based on the location of the computer, time of day and other security conditions. It then gathers the required biometrics from the user, and determines if they match the biometrics on record for that user. If the user is determined not to be authentic, or the user's pattern of activity is sufficiently suspicious, a security policy may use access subterfuge to protect the integrity of the resource.

It is an object of the present invention to provide a simple security method and apparatus.

It is another object of the present invention to provide a simple and inexpensive security system.

It is a further object of the present invention to provide a method and apparatus for biometric authentication.

It is still another object of the present invention to provide a method and apparatus for biometric authentication in which the requirements for authentication can be made relatively unpredictable until the time of access.

To achieve the above and other objects, according to an embodiment of the invention, a method of authenticating a user comprises: obtaining a user profile; receiving biometric information; obtaining stored user biometric information; comparing at least some of the stored user biometric information and said received biometric information based on the user profile; and determining if the user is authenticated based on the comparison.

According to another embodiment of the present invention, a biometric authentication system comprises: an input device for providing biometric information; a memory operatively connected to store user biometric information; a memory operatively connected to store at least one user profile; a controller operatively connected to compare at least some of the stored user biometric information and the biometric information provided by the input device, based on the user profile, and to determine if a user is authenticated based on the comparison.

DETAILED DESCRIPTION OF THE PREFERRED EMBODIMENTS

According to an embodiment of the present invention, computer network security is enhanced by the implementing biometric authentication software at a server that is governed by an authentication policy. The authentication policy is flexible and allows the biometric authentication procedure implemented at any given computer or location within the network to be altered based on security conditions.

Definition of Terms

For the purpose of this document the following terms should be interpreted to mean the following:

Authentication—A process to ensure that an individual is whom they claim to be. Authentication is typically tied to allowing a person to login into a computer system.

Biometric—A biometric is any measurable aspect of a lifeform, such as a fingerprint, iris scan, voice print, or even a person's height. The term also refers to the measurement itself.

Biometric Profile—A Biometric Profile ("BP") is a set of information about an individual's physical characteristics. This set may include, but is not limited to: patterns of the skin, such as finger prints, toe prints, etc.; characteristics of the eye, such an image of an iris; voice patterns; and other types of images of the body, such a ultra-violet, thermal or infra-red scans. The BP may be limited to one representation of a single physical characteristic or may be as robust as multiple physical characteristics with multiple representations of each characteristic. For example, a BP could be created for someone with a single scan of her right thumb. Another example of a BP could be two scans, each in a different wavelength of light, of all ten of the person's fingers along with a scan of the person's left iris. The biometric information also need not contain only complete scans. Rather, the biometric information may be stored in a reduced form containing only the salient features of the scan.

Device—Any physical electronic device requiring authentication that a user would use. This could be a personal computer, thin client to a computer server, PDA, automobile, etc.

Plug-in Framework—A plug-in framework is a method in which two pieces of software (software A and software B) communicate to each other, but the communication is done in such a way that one piece of software, software B, could be replaced with another without modifying software A.

Scanning device—Any physical device that can produce a digital representation of a part of the human body or byproduct of the human body. This may include, for example, a finger print scanner, a voice representation device, and an iris scanner. These scanners could scan via physical appearance, ultra-violet, infrared, etc. Many other types of scanners are possible and the broadest possible definition is intended.

Access Subterfuge—An attempt by the system to escape intrusion by an attacker. The system may use a variety of mechanisms that seek to delay an imposter, who has been detected attempting to gain access to unauthorized resources. The delay is intended to occupy the intruder until designated authorities can arrive. For example, the imposter may be re-directed to a false area or resource which the imposter will spend time examining while authorities arrive. Or simply a long time may pass before (possibly false) access is granted. In addition the system may attempt to 'bluff' potential imposters by always rejecting the first access attempt. Also the system may lock out the machine from which failed access was attempted, as well as locking out the user from future authentication.

BiObex—BiObex refers to the biometric authentication product developed by Advanced Biometric Computing, LLC. The name may change in the future. BiObex is only used to represent this product in this document.

Authentication Policy

A biometric authentication policy is a set of rules and procedures defined by an organization. The policy implicitly or explicitly specifies how various resources on the organization's network should be biometrically protected. Typically the policy is implemented as a custom 'Plug-in' software component or a configuration of an existing software component. An authentication engine collects key pieces of information, referred to as security conditions, and presents them to the policy at appropriate times. The output of the policy then, controls the behavior of the authentication engine to within certain customizable behaviors. The rules may be different for each computer network, depending on the security needs of the organization. An authentication policy is composed of three components: Requirements, Matching, and Security (all defined below).

The requirements component of a policy determines the set of biometrics required to authenticate a user. It does this based on the user's identity, biometric profile, physical location, type of resource the user is attempting to access, and the hardware devices available at that location. Other security conditions such as the time of day and day of the week may also be used to influence the decision. The biometrics required may be from a single person or from multiple persons.

Given that a network is deployed with computer terminals that are connected to the network at different locations within a physical building, certain locations may be considered more secure than others. This may be because some locations are guarded or because they require a user to present more credentials to be able to access them.

Moreover, building access might be available 24 hours a day to employees who present proper credentials. This allows access to the computer network at hours where few people are around. Accordingly, after hours access might require more biometric authentication because the risk of intrusion is considered higher.

In a heterogeneous hardware environment, some locations may have different sets of biometric devices than other locations. This may occur for a variety of reasons, including that the biometric devices, such as finger print scanners, were purchased at different times so that there is a variation in model, type and performance among the scanners.

The authentication policy should define what the requirements are for authenticating a user at each location on the computer network.

Matching is a determination of authenticity of the user based on the authentication requirements, the user's biometric profile, and the set of biometrics gathered from an individual seeking authentication as the user. Other information or security conditions, (such as the location and time of day, etc) may be used as part of the matching criteria as well, specifically for determining a confidence threshold. The matching policy decides when the evidence presented is strong enough to grant authentication; when the evidence is weak enough to revoke authentication; or possibly when more biometrics must be acquired or re-acquired.

Secure locations may set a higher confidence threshold for a match, while less secure locations set a lower threshold to be more lenient and avoid multiple user login attempts where possible.

The security policy determines if any special action is required based on the past history of events for that user, location or network. The special action may include access subterfuge and storing a log entry identifying each failed login attempt. Other examples of special action might be locking a user out based on a number of failed authentication attempts, or alerting a user to re-enroll because the user's fingerprints appear to have changed slightly since the user enrolled.

The system may compare present biometric scans to previously acquired biometric scans in an attempt to detect imposters who have stolen previous biometrics. Digital signatures or message digests of the scans may be compared instead of the scans themselves (for efficiency reasons); however these methods will not be robust if the imposter can add noise to the scan and re-encrypt it. If an exact or almost exact match is found, the new biometric could be one interposed on the network by someone who has compromised the system and copied a previous scans from the network.

Authentication policies do not need to consider all of the information provided by or available from the network. However, according to the present invention, during the authentication process, the authentication policy must make a determination for matching and requirements (defined above). The security policy is optional and no action is required, but may be taken.

Illustrative Server Architecture for Biometric Authentication

Figure 1:
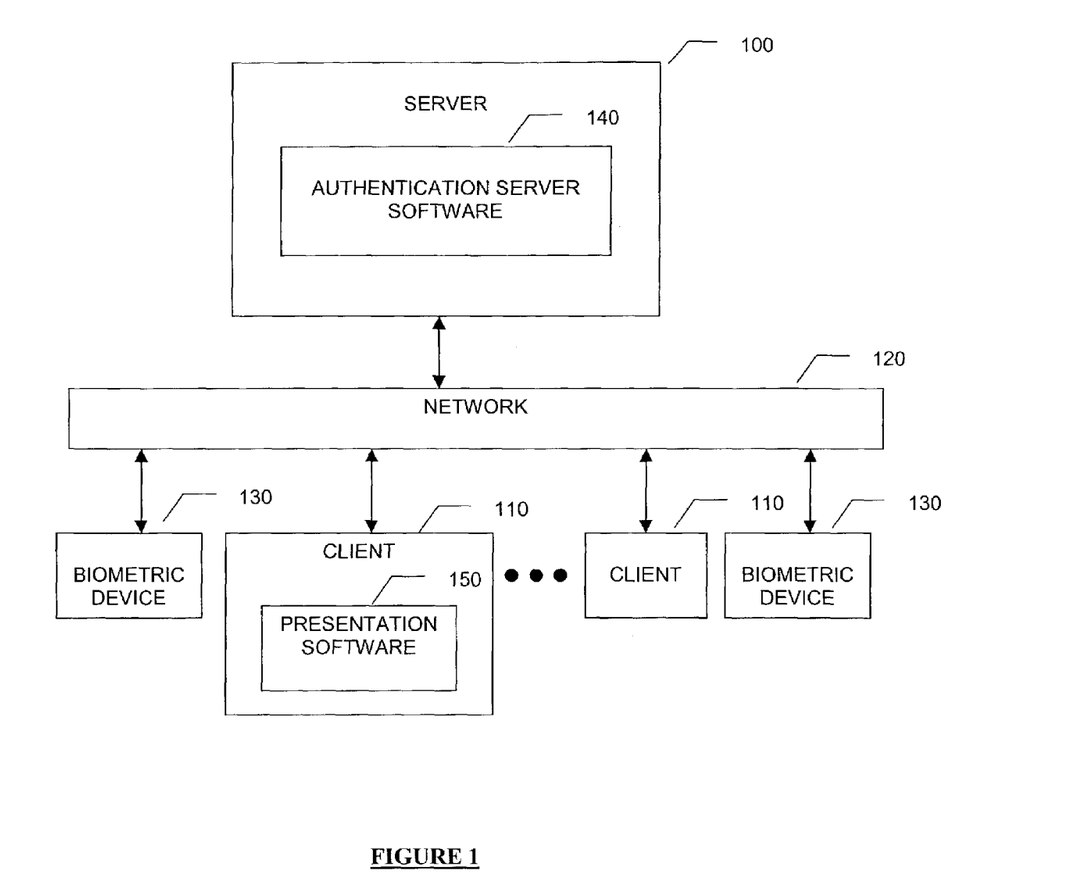
FIG. 1 is a schematic block diagram of a client server architecture in which an embodiment of the present invention may find application.

FIG. 1 depicts a schematic block diagram of a security system embodying the present invention. Referring to FIG. 1, a server 100 is coupled to a plurality of client computers over a computer network 120. The network may be, for example, a local area network ("LAN") or a wide area network ("WAN"). The network may be contained within a single physical building or interconnected several remotely situated buildings.

The client computers 110 are used to gain access to the network, generally by employees, to perform work for the business that owns the network. Positioned at each client computer is at least one biometric reader or scanner device. The biometric scanner(s) are used to read one or more particular biometrics associated with an individual and send the biometric measurements to the computer network for use in authenticating the individual as a valid user of the computer network.

The client computers 110 run a presentation software program 150. The presentation software program is invoked after the client computer is started each time control of a computer resource changes hands, from one user to another. When a computer first is turned on, initially it is controlled by no user; control transitions when the first user then tries to log on, and back to no user when the user logs off or are logged off due to inactivity. Similarly when users wish to take control of an authenticated resource, such as an application or database on the network, the presentation layer guides them through the authentication process.

The server 100 may be coupled to multiple client computers which are distributed within a facility over the network 120. The server computer runs biometric authentication server software 140, which is a program run from the server's memory. The biometric authentication server software 140, hereinafter referred to as the server software 140, interacts with the biometric devices, the client computer and the computer network to authenticate users to the network. The server software 140 instructs the user how to authenticate herself to the network, collects and processes the biometrics received from the biometric scanner and user information from the user for the location where the user is logging on. The software 140 grants or denies access based on a comparison between the collected biometrics, the biometrics in the user database for the user and the requirements and matching policies. The operation of the server software is described in more detail with reference to FIG. 2.

The client computer may be a standard computer or a thin client. Thin clients are computer systems that simulate a personal computer to the user. Typically, they are set up with a large single computer that has multiple monitors, keyboards and mice attached to it. A given user will have a single monitor, keyboard and mouse and when the user gains access to the system, it appears to be a personal computer. In reality the user has a session on the large computer that controls the monitor, keyboard and mouse to simulate a personal computer look and feel.

Implementing biometric authentication on thin clients creates additional difficulty over implementing biometric authentication on a single-computer architecture or a client-server architecture. The main difference between other architectures and thin client architectures is that in the other architectures, each user has a dedicated computer containing a CPU, memory, ports, etc.

Figure 2:
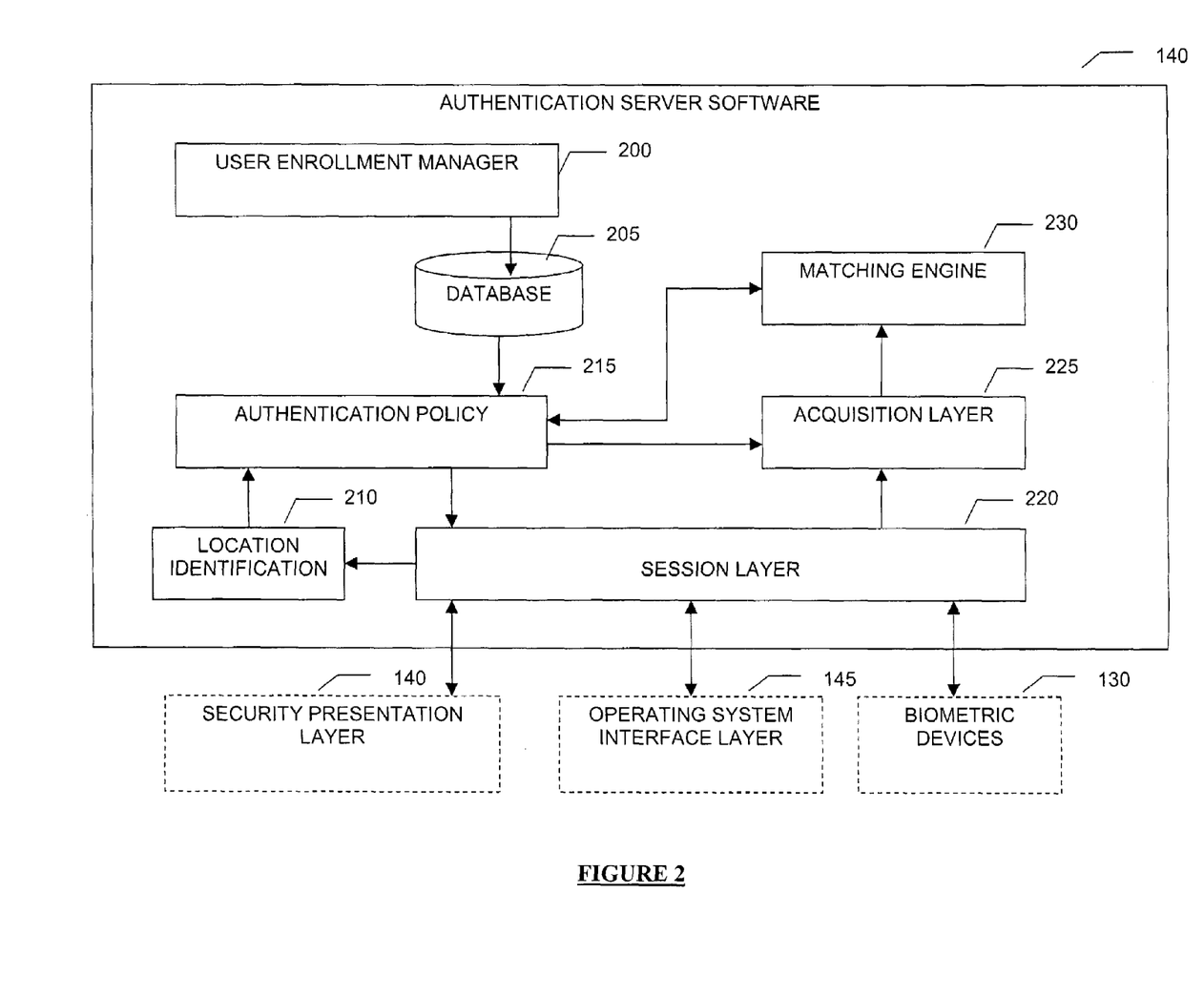
FIG. 2 is an expanded view of the biometric authentication server software according to an embodiment of the present invention.

FIG. 2 depicts a functional block diagram of the biometric authentication server software 140. The server software 140 is generally stored on a hard disk drive associated with the server and is loaded into the memory of the server for execution when the server is turned on and is running. The server software includes an enrollment manager 200 that interacts with a persistent storage medium 205. This storage 205, may be a centralized database or distributed, as in the case where each user carries a portable storage media, such as a smart card, containing one or more biometric profiles. In either case it must be accessible by the server. The profile on the storage media may optionally be cryptographically protected as discussed in a later section.

The enrollment manager 200 is responsible for collecting and storing information for each valid user of the network into the storage media 205. The enrollment manager 200 may collect user identification information (USER ID) from a new user, such as the user's name or a derivative of the user's name. The enrollment manager 200 also collects from the user one or more biometric profiles. The user's biometric profile comprises one or more biometric scans of a particular characteristic of the user using one or more biometric scanning devices.

According to the present invention, any biometric scanner may be used to acquire any particular biometric characteristic of the user for inclusion in the biometric profile. In the case of fingerprints, one or more fingerprints of each user may be scanned using one or more fingerprint scanning devices. Fingerprint scanning and storage for biometric authentication is well known and any technique may be used in connection with the present invention.

According to a well known technique, fingerprints may be scanned and then processed prior to storing the scanned image. The fingerprint processing may be performed to extract features of the fingerprint, such as minutia, which are patterns of ridges of the skin. Each minutia point represents the beginning or end of a skin ridge. For example, a ridge of skin may bifurcate or trifurcate at particular points. The beginning or end points and the angle of the skin ridge relative to a preferred direction at the beginning or end points characterize the minutia. Information describing the minutiae for fingerprints may be, for example, extracted, processed and efficiently stored to represent the fingerprint(s) for biometric authentication. Fingerprints may be scanned multiple times to obtain a more accurate sample for processing and increase the likelihood of correct identification.

Figure 3:
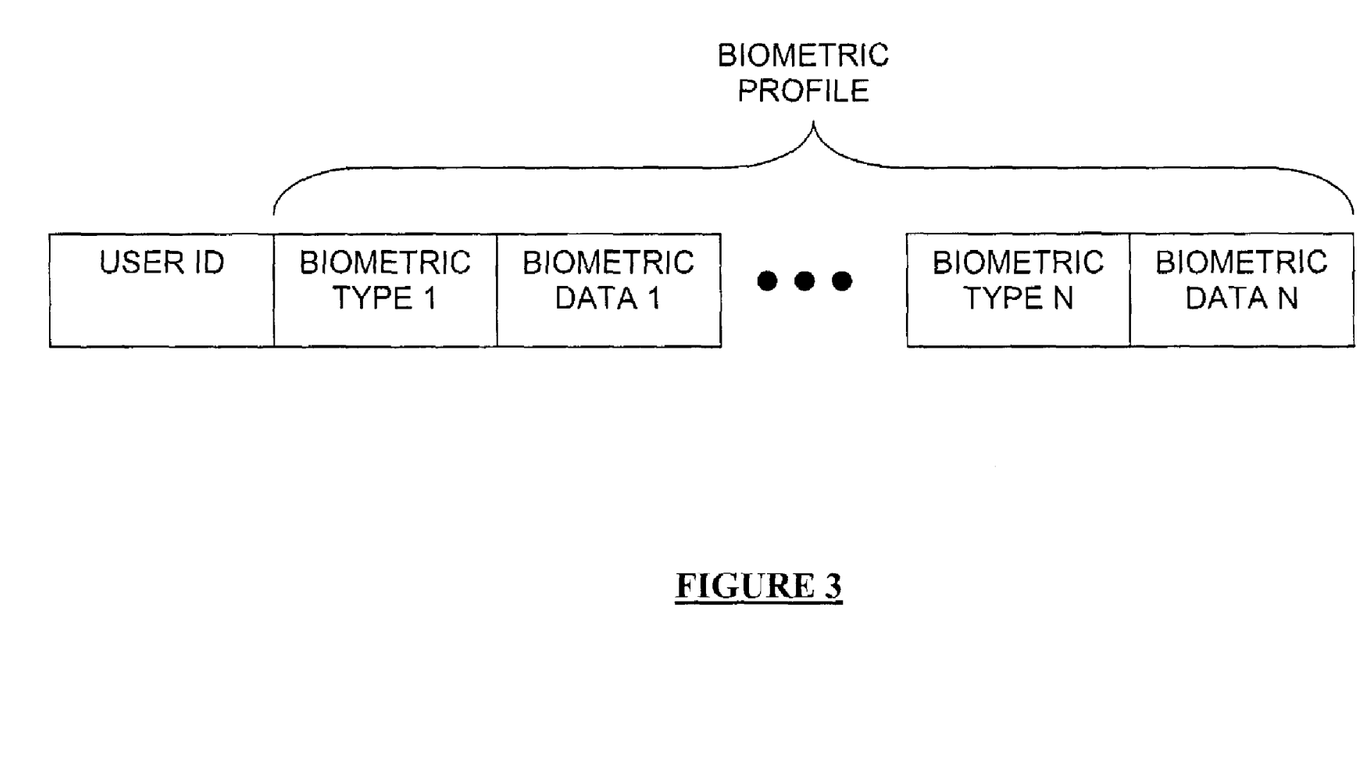
FIG. 3 is an illustrative diagram of a user entry in the database.

The userID and biometric profile for each user is stored by the enrollment manager in the database. The biometric information may be encrypted prior to storing the data. In addition, for each biometric or biometric device that the user is entitled to use, biometric data may be generated and stored for the user in the enrollment database as part of the biometric profile. FIG. 3 shows an illustrative view of a database entry for a user. The entry includes the user's USER ID, and an entry for each biometric device type that the user has been measured on up to N biometric devices. The database also stores the biometric data measured from the user for that particular biometric device. In this manner, the database stores biometric measurements for the user taken by one or more devices present on the network that the user needs to access.

The enrollment manager 200 may be managed and operated only by a handful of people who are set up as enrollment officers. The enrollment officers must authenticate themselves to both the network and separately to the enrollment manager 200 using biometric authentication prior to enrolling any new users. The enrollment officers may also configure a user's network access privileges and other information and may modify a user's profile or delete a user altogether. In this manner, the enrollment manager controls which users are allowed to use the system and stores the biometric profiles of all users in the enrollment database.

The authentication policy engine 215 implements the authentication policy of the network. It is configured based on the defined requirements, matching criteria and security policy to carry out the authentication policy of the system. It interfaces with the location identification engine 210, session layer 220, acquisition layer 225, and the matching engine 230.

The session layer 220 communicates with the security presentation layer 150, which may reside on the client or on the server. The session layer is responsible for monitoring each client that is connected to the network and allocating resources of the server software to each client. It is also responsible for translating commands, information and protocols between the server software 120 and the security presentation layer where necessary.

The security presentation layer 235 is responsible for presenting the user an interface for use in the authentication process. It may be software that resides on the client that is executed out of the client or, in the case of a thin client, it may reside on the server as well. The security presentation layer 235 may include a screen prompt inviting would be users to enter their USER ID. The security presentation layer 235 also prompts users throughout the user authentication process based on information and instructions conveyed from the authentication policy engine based on the requirements and matching policy of the system.

The operating system interface layer 145 interacts with the operating system to gather information about the hardware, and remote address of clients requesting authentication. When required, it notifies the operating system of the final authentication output (access granted or denied) from the authentication policy in cases where the user is trying to log in to the operating system; since to biometrically authenticate access to a computer, the computer operating system must be notified. In many UNIX operating systems, the operating system interface layer 145 and presentation layer 140 are combined and integrated into a standard framework known as PAM (Pluggable Authentication Modules). This framework then interfaces with various PAM aware applications.

The location identification engine 210 communicates with the session layer. When a user accesses a terminal to authenticate, the location identification engine determines which scanner(s) are beside the user who is trying to login. In the single computer or client-server architecture, the scanner plugs directly into the user's computer. Each computer has its own scanner. However, in a thin client architecture, each user does not have his or her own computer but rather only a monitor, keyboard, and mouse. This requires that all of the scanners be connected to a single large computer through a network. Hence the problem is determining which of the many scanners is associated with the monitor, keyboard, mouse combination of the user's chosen terminal.

The server software 140 solves this problem with the location identification engine which obtains unique information from the hardware that the user is using to try to log in from. This unique information is associated with the logical location of the scanner that is beside that thin client. Now the single large computer knows which scanner to take the scan from. For example, in Sun Microsystem's SunRay (thin client) architecture, BiObex receives the MAC address of the client and determines the IP address of the scanner located next to that client. The administrator of the SunRay manages this information in a file or database associated with BiObex. The MAC address is the unique information from the hardware and the IP address is the logical location of the associated scanner.

Once the location is established and the permissible scanning devices are determined, the authentication policy determines the requirements and matching criteria. Additional inputs to the authentication policy engine 215 for determining the requirements and matching criteria are various security conditions and may be, for example: time of day, day of week, location, previous failed login attempts of the user, previous failed login attempts, past statistical metrics from the matching engine 230.

Based on the location and security conditions, the authentication policy engine determines which biometric devices the user must use for authentication and what steps the user must perform using those devices. The authentication policy engine then notifies the security presentation layer 140, of the step by step requirements via the session layer 220. The presentation layer 140, in turn presents the instructions to the user, possibly taking in to account the user's native language.

The acquisition layer 225 receives biometric measurements from the biometric equipment at the user's location via the session layer and network. The acquisition layer may send messages to the user when a poor sample was received via the session layer and the security presentation layer prompting the user to perform a rescan. Upon acquiring one or more biometric measurements required by the system, the acquisition layer makes the measurements available to the matching engine 230.

The matching engine 230 receives the USER ID and the biometric measurements from the acquisition layer. The matching engine then retrieves the biometric profile stored for the user in the database based on the USER ID. The matching engine then compares the biometric measurements received from the individual attempting to log on with the stored biometric profile stored in the database in connection with the USER ID. The matching engine returns to the authentication policy engine a confidence figure indicating the likelihood that the biometric measurements acquired came from the same person that provided the biometric profile stored in the database.

The criteria for determining whether a match is sufficiently close to allow the user to be authenticated is determined by the authentication policy engine. This criteria, the matching threshold, may vary based on the location, user, security conditions, or other factors according to the present invention. If the comparison from the matching engine yields a likelihood in an acceptable range, then the authentication policy engine determines that a match has occurred and the user is allowed to access the system. Otherwise, the user is not allowed to access the system normally and a security policy may be implemented.

In each case an appropriate message is sent to the user via the session layer and the security presentation layer. The message indicates that the user has successfully logged on or has failed authentication. Even if the user fails authentication, the security policy may inform the user that he has successfully logged while the access subterfuge methods defined by the security policy are carried out. In this manner, the authentication server software grants or denies access to the system based on how closely the biometric measurements received from an individual match the biometric profile stored in the database for the users.

Figure 4:
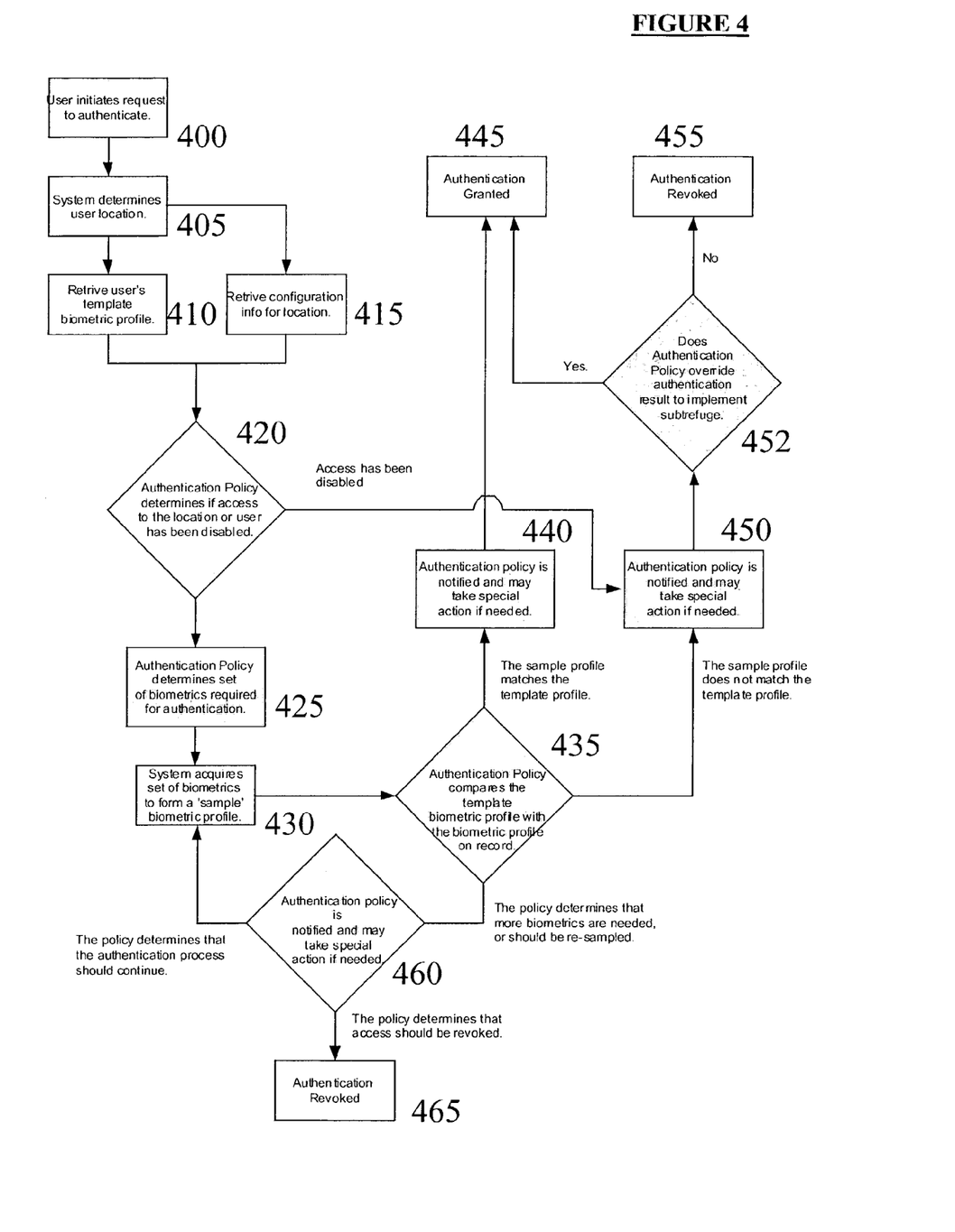
FIG. 4 is an illustrative logic flow diagram in accordance with an embodiment of the present invention.

FIG. 4 depicts a method of operating the biometric server authentication software according to an embodiment of the present invention. Referring to FIG. 4, in step 400, the user initiates request for authentication. Typically users identify themselves with a name, or token known to the system, for example their UNIX login or an ID stored on a token card.

In step 405, the authentication software 120 determines user location. The system determines the physical location of the user by retrieving a unique identifier for the terminal or device that user is physically accessing. If the scanners used are Ethernet based scanners, the physical location of the user is then mapped to the logical address of the scanner. This mapping must be maintained by the administrator of the system, in such a way that logical scanner addresses are physically close to the computers that are enabled for biometric access control.

In step 410, the authentication policy retrieves the user's template biometric profile from a persistent storage medium such as a database, file, or smartcard. The primary purpose for the template to be loaded is so that a subset of the biometrics in the template may be chosen as a basis for authentication. On systems where the full biometric template is loaded, a side benefit is that the biometric profile may remain cached in memory until it is needed for comparison.

It will be understood, however, that the actual 'biometric template' is not required to leave the storage medium as a whole, as the matching phase could take place completely on the device that stores the template (such as a 'smart card'). For example, privacy concerns of some organization may require that the biometric template never leaves the storage media. All that is required for step 410 from the storage media is an index of which biometrics are contained in the profile, so that the authentication policy may determine a subset of those for authentication.

In step 415, the server software 120 retrieves configuration information for the location from which authentication is sought. Location information is retrieved in step 410, using the unique identifier determined in step 405. This information might comprise the type of scanners (fingerprint, eye, palm . . . etc) as well as the brand and biometric format that each device produces.

This is primarily useful in an environment with heterogeneous scanning hardware, multiple hardware vendors, or multiple biometrics factors (eye as well as fingerprint for example) required for authentication.

In step 420, the authentication policy determines if the location or user has been disabled. Certain locations may be disabled regardless of who is logging in. This may be done due to access hour restrictions, excessive failures, or any other convenient administrator customizable criterion. Such a precaution allows administrators to reduce the impact of denial of service attacks. If the system determines that the location or user has been disabled, step 450 begins and access is blocked and special action may be taken if needed. If access subterfuge is in use, this action may include presenting the user with a normal looking login screen that collects the user information including biometrics, before directing the user into a false area. If the system determines that the location or user has not been disabled, then step 425 begins.

In step 425, the authentication policy engine determines a set of biometrics required for authentication. It does this based on the information determined in steps 415 and 410 and the administrator customizable authentication policy upon which it operates. For example, secure areas may require 2-3 fingerprints while less secure daily work areas would require only one (for convenience to the workers).

In step 430, the acquisition layer then takes the set of required biometrics and interfaces with the appropriate scanning hardware to gather a 'sample set' of biometrics. The system displays an indication of the biometrics required and overall progress to the user as the hardware acquires the biometric. This is usually done one biometric at a time, but may be more: some scanners can acquire several prints at once, or both eyes at once for example. This step includes loading device drivers specific to the various scanners, and communicating with the scanning hardware.

In step 435, the authentication policy engine compares the sample set of biometrics with the biometric profile on record through the use of one or more matching algorithms. There may be multiple algorithms used depending on the set of biometrics acquired. For example, an iris matching algorithm differs from a fingerprint matching algorithm. Based on the results of comparison with the template, there is one of 3 outcomes:

1. The sample matches the template profile.
2. The sample does not match the template profile, or for other reasons, access should not be granted. If the maximum number of user retries has been reached, for example, access is not allowed.
3. More samples are needed and/or existing samples must be re-acquired. For example if a print is of poor quality (too faint) the system may decide that it be must be re-scanned. As a security measure, the administrator may want to require two passes of biometrics, to make it appear to an impostor that they have failed and must retry the same biometric.

If the sample profile matches the biometric profile in step 435, then step 440 begins. In step 440, the authentication policy is notified and may take special action if needed. This step is basically a logging and access subterfuge step so that, for example, biometrics from failed logins can be captured and stored for future investigation.

In step 445, authentication is granted after a successful match. This means the authentication server software now returns a token implying "yes the user is who the user says the user is."

If in step 435 the authentication policy determines that the biometric profile does not match, step 450 begins. Step 450 is very similar to step 440 and results in a specified action being taken when authentication failed. In many cases, step 450 will involve logging the attempt and, possibly setting internal and external variables to support further access subterfuge. Step 452 allows the authentication an 'override' for the cases in which access subterfuge is desired, changing the authentication response from a token indicating 'Authentication Not Granted' to a token indicating 'Authentication Granted'. This step is necessary to allow access subterfuge, without it there would be no way to give the intruder appearance of success.

In step 455, user authentication is not granted, the authentication system now returns a token implying 'the user does not appear to be who they claim'. This token may then be passed on to the operating system or any other program requesting authentication. This message may be conveyed to the user through the session layer to the operating system layer and security presentation layer 235.

If in step 435 the authentication policy determines that more biometrics are needed or should be resampled, then step 460 begins. The authentication policy is notified and may take special action if needed. First, the authentication policy is consulted to determine if the number of log in attempts or re-acquisition attempts is reasonable or exceeds a predetermined threshold. Another factor could be how well the re-acquired print matches the original to detect a user trying various keys. If the re-acquired print is close, additional retries may be appropriate. If so, then step 430 begins again to acquire more samples and then step 435 executes to determine whether the sampled biometrics match.

If after a reasonable number of passes through the loop of step 435, 460 and 430 the authentication is not successful, then the system may take a special action defined by the security policy to implement access subterfuge. In addition, step 465 begins and the authentication of the user is not allowed.

The following additional variations of the server architecture and software may be implemented depending on the particular security policy desired.

Scalability for Simultaneous Logins

When implementing biometric authentication on a thin client architecture, handling simultaneous logins should be addressed. On a single computer architecture, there is a one to one relationship between the scanners and computers. This makes concurrent login of two different users impossible. In a thin client architecture, there are many users logging into the same computer and this could happen at the same time.

To resolve this issue, the authentication server software 140 may be configured to run multiple instances of all or a portion of the software. In particular, the computationally intensive parts of biometric matching may be run not only in separate instances but also may be run on a separate server or servers if necessary. Parallel processing is achieved through a pool of active compute engines (separate processes), which are always running and may be allocated to process concurrent requests for authentication.

Each computer system described in the application may be implemented as a general purpose computer system and may include an input/output unit for connection to the communication network, a memory for storing program instructions and data received from the communication network and a processor coupled to the memory and input/output unit for executing the program instructions. The computer may be a desktop or portable type of computer, a handheld computer, a personal organizer or any other type of electronic device that provides access to sensitive information.

The methods depicted in FIG. 4, may be implemented as program instructions executed by the processor of one or more general purpose computer systems. The program instructions corresponding to the methods disclosed herein may be stored within a computer usable medium, such as a hard or floppy disk, a compact disc (CD) read only memory (ROM), a ROM, a file sent over a network or other vehicle for storing and/or delivering information to a computer. The program instructions corresponding to methods disclosed herein may be uploaded to the memory by devices corresponding to the medium, such as hard disc drives, and the program instructions may be executed by the processor of a general purpose computer to cause one or more of the computers to execute the steps shown and described.

Authentication Across the Internet

The above embodiment will function correctly and securely over public, wide area networks, such as the Internet; given the following conditions are met. 1) The scanning devices used at the remote site are capable of communicating with the authentication server either directly or through a layer provided by the authentication client, 2) Communications are implemented using a protocol which is secure across a public network (such as the Transport Layer Security (TLS) protocol). 3) The client has a way of communicating either: a) a token known to the server with the logical addresses of any scanners derived from this token by the server; b) directly indicating its logical address (such as the IP address or hostname) as well as the logical address and descriptions of any scanning devices; or c) the client can provide communication to any scanning devices with the client acting as a conduit for communication. 4) Ideally, either the scanning devices or authentication clients are capable of proving the authenticity of the scan—that is that the scan produced actually came from the physical scanning device: for example each scanner may contain a separate encryption key, known only to the server.

In the case where the scanning devices are network devices, capable of implementing the TLS protocol the security is considered to be best. Since the scan is coming directly from the device and across the network, an attacker seeking to steal biometrics must attack the network, scanning device, or authentication server. Communications across the network are protected by a secure protocol; the scanning device in most cases is not programmable, and thus not easily attacked; and the server is assumed secure (otherwise the prospect of authentication is not valid). Condition 4, while not strictly necessary for a functioning system, gives the assurance that the biometric is coming from the device that the server assumes and not a falsified scan. Conversely, the case were the authentication client acts as the conduit, the security is considered less good because typically there are many client machines, often with varying levels of security. It is thus, easier for an attacker to compromise a client machine and passively steal biometric information, with which to stage later attacks. This configuration may be made more secure provided that un-encrypted biometric information never passes through the client's memory (where it would be subject to capture on a compromised client machine).

As an illustrative example of an embodiment of the invention, consider an organization with 3 different areas, of security: Regular, Secure, and Highly Secure. Such an organization may create 3 polices, one for each area.

| Policy | Description |
| --- | --- |
| Regular | One finger, chosen at random, is required for authentication. Confidence for a match must be in the range [90%, 100%] After 5 failed login attempts, the user is locked out of their account. |
| Secure | Two fingers, chosen at random, are required for authentication. Confidence for a match must be in the range [96%, 100%] Access is restricted to business hours [9 am-6 pm] After three failed login attempts, the terminal and user are locked out, and an alert is sent to security by email. |
| Highly Secure | Two fingers, chosen at random, and a voice print, are required for authentication. If access falls outside normal business hours [7 am-8 pm], a third fingerprint is required. Confidence for a match on any biometric must be in the range: [98%, 100%] If the confidence level for any biometric match falls within the range: [0%, 65%] access subterfuge is attempted, and the user is given the appearance of a successful login, the user is directed to a false 'sandbox' area with false documents, while the security desk is paged. If the failed matches were in a medium range [65%-97%], the user is given another login attempt, perhaps with a suggestion to clean the scanner. If the user or terminal requesting login is inactive, the same access subterfuge actions are performed. If the first and second attempts are both failed, the same access subterfuge actions are performed, and the user and terminal are inactivated. |
| Admin | Users with sufficient system permissions to modify the BiObex configuration files and policies are associated with a group. Request to login as an administrator requires 2 fingerprints from any 2 active users in the administrator group. Confidence for a match must be in the range [95%, 100%] After 3 failed logins, both administrators are made inactive. If the confidence level for any biometric match falls within the range: [0%, 65%], security is alerted. |

Assuming that the organization gives permissions to data based on both the user and the physical area, polices would be mapped to both users and physical areas. So that an attempts to gain access from a secure area, and attempts to login as a secure user will both invoke the 'secure' policy.

While particular embodiments of the present invention have been disclosed, it will be understood by those having ordinary skill in the art that changes may be made to those embodiments without departing from the spirit and scope of the invention.

What is claimed is:

1. A method for authenticating a user, comprising:
receiving biometric information from a user;
retrieving an authentication policy that includes at least one requirement for authentication based on at least one security condition, including time of day;
retrieving stored user biometric information based on the authentication policy;
comparing the stored user biometric information and the received biometric information based on the authentication policy; and
determining if a user is authentic based on the comparing.

2. The method according to claim 1, wherein the biometric information is received from the user over a network.

3. The method according to claim 2, wherein the network is the Internet.

4. The method according to claim 1, wherein the authentication policy includes at least one requirement for authentication based on the user location.

5. The method according to claim 1, wherein the at least one security condition includes previous failed login attempts.

6. The method according to claim 1, wherein the authentication policy includes matching criteria.

7. The method according to claim 6, wherein the matching criteria are determined based on security conditions.

8. The method according to claim 7, wherein the security conditions further include at least one previous failed login attempt.

9. The method according to claim 1, wherein the authentication policy includes a security policy and wherein the security policy defines a security action to be taken when the user is determined not to be authentic.

10. The method according to claim 9, wherein the security action is simulating a normal authentication.

11. The method according to claim 9, wherein the authentication policy determines not to retrieve any additional biometric information from the user when a predetermined threshold is reached.

12. The method according to claim 1, further comprising:
retrieving additional biometric information from the user when the comparing determines that additional biometric information is needed.

13. The method according to claim 1, further comprising:
granting a user access to a computer upon determining that the user is authentic.

14. The method according to claim 1, further comprising:
storing user identification, location and time information for failed authentication attempts.

15. The method according to claim 1, wherein the authentication policy is retrieved from a network database.

16. The method according to claim 1, wherein the authentication policy is retrieved from a personal storage media.

17. The method according to claim 1, further comprising at least two authentication policies corresponding to policies in effect at different physical locations and further comprising selecting the authentication policy for retrieval.

18. The method according to claim 1, wherein the stored biometric information includes fingerprint information for more than one finger of at least one user, and wherein the comparing the stored user biometric information and the received biometric information based on the authentication policy includes comparing a scan of at least one of a user's finger with the fingerprint information for a corresponding one of the fingers.

19. A computer program product for causing a computer to authenticate a user, the computer program product comprising a physical, computer usable medium having computer program logic stored therein, the computer program logic comprising:
logic causing the computer to retrieve scanned biometric information for a user from a scanning device;
logic causing the computer retrieve an authentication policy that includes user biometric information and requirements for authentication based on at least one security condition, including time of day;
logic causing the computer to compare the user biometric information and the scanned biometric information based on the authentication policy; and
logic causing the computer to determine if a user is authentic based on the comparing.

20. The computer program product according to claim 19, wherein the biometric information is received from the user over a network.

21. The computer program product according to claim 20, wherein the network is the Internet.

22. The computer program product according to claim 19, wherein the authentication policy includes requirements for authentication based on the user location.

23. The computer program product according to claim 19, wherein the security conditions include previous failed login attempts.

24. The computer program product according to claim 23, wherein the security conditions include the time of day for previous failed login attempts.

25. The computer program product according to claim 19, wherein the authentication policy includes matching criteria.

26. The computer program product according to claim 25, wherein the matching criteria are determined based on security conditions.

27. The computer program product according to claim 19, wherein the authentication policy includes a security policy and wherein the security policy takes a security action when the user is determined not to be authentic.

28. The computer program product according to claim 27, wherein the security action is simulating a normal authentication.

29. The computer program product according to claim 19, further comprising:
logic causing the computer to retrieve additional biometric information from the user when the comparing determines that additional biometric information is needed.

30. The computer program product according to claim 29, wherein the authentication policy causes the computer to determine not to retrieve any additional biometric information from the user when a predetermined threshold is reached.

31. The computer program product according to claim 19, further comprising:
logic causing the computer to grant a user access to a computer upon determining that the user is authentic.

32. The computer program product according to claim 19, further comprising:
storing user identification, location and time information for failed authentication attempts.

33. The computer program product according to claim 19, wherein the authentication policy is retrieved from a network database.

34. The computer program product according to claim 19, wherein the authentication policy is retrieved from a personal storage media.

35. The computer program product according to claim 19, further comprising at least two authentication policies corresponding to policies in effect at different physical locations and wherein the computer program logic further comprises logic causing the computer to select the authentication policy for retrieval.

36. The computer program product according to claim 19, wherein the retrieved biometric information includes fingerprint information for more than one finger of a user and the logic causing the computer to compare the retrieved user biometric information and the scanned biometric information based on the authentication policy includes comparing a scan of at least one of a user's fingers with the fingerprint information for a corresponding one of the fingers.

37. A system for authenticating a user, comprising:
a persistent storage medium for storing an authentication policy, including at least one requirement for authentication based on at least one security condition, including time of day;
a computer in communication with a network, the computer including a server authentication program stored therein, the computer executing the server authentication program to a) receive scanned biometric information from a scanning device for a user; b) retrieve an authentication policy; c) retrieve stored user biometric information based on the authentication policy; d) compare the stored user biometric information and the received biometric information based on the authentication policy; and e) determine if a user is authentic based on the comparing.

38. The system according to claim 37, wherein the computer receives the scanned biometric information from the user over a network.

39. The system according to claim 38, wherein the network is the Internet.

40. The system according to claim 37, wherein the authentication policy includes requirements for authentication based on the user location.

41. The system according to claim 37, wherein the security conditions include previous failed login attempts.

42. The system according to claim 37, wherein the authentication policy includes matching criteria.

43. The system according to claim 42, wherein the matching criteria are determined based on security conditions.

44. The system according to claim 43, wherein the security conditions include the time of day or previous failed login attempts.

45. The system according to claim 37, wherein the authentication policy includes a security policy and wherein the security policy causes the computer to take a security action when the user is determined not to be authentic.

46. The system according to claim 45, wherein the security action is simulating a normal authentication.

47. The system according to claim 37, wherein the computer retrieves additional biometric information from the user when the computer determines, based on the comparing, that additional biometric information is needed.

48. The system according to claim 37, wherein the computer determines based on the authentication policy not to retrieve any additional biometric information from the user when a predetermined threshold is reached.

49. The system according to claim 37, wherein the computer further grants a user access upon determining that the user is authentic.

50. The system according to claim 37, wherein the computer stores user identification, location and time information for failed authentication attempts.

51. The system according to claim 37, wherein the computer retrieves the authentication policy from a network database.

52. The system according to claim 37, wherein the computer retrieves the authentication policy from a personal storage media.

53. The system according to claim 37, further comprising at least two authentication policies corresponding to policies in effect at different physical locations and wherein the computer further executes the server authentication program to select the authentication policy for retrieval.

54. The system according to claim 37, wherein the stored biometric information includes fingerprint information for more than one finger of at least one user, and wherein the comparison of the computer in d) includes comparing a scan of at least one of a user's fingers with the fingerprint information for a corresponding one of the fingers.

55. A method for authenticating a user, comprising:
receiving biometric information from a user;
retrieving an authentication policy that includes a security policy;
retrieving stored user biometric information based on the authentication policy;
comparing the stored user biometric information and the received biometric information based on the authentication policy; and
determining if a user is authentic based on the comparing; and
wherein the security policy defines at least one security action when the user is determined not to be authentic.

56. The method according to claim 55, wherein the security action includes simulating a normal authentication.

57. A method for authenticating a user, comprising:
receiving biometric information from a user;
retrieving an authentication policy that includes at least one requirement for authentication based on at least one security condition;
retrieving stored user biometric information based on the authentication policy;
comparing the stored user biometric information and the received biometric information based on the authentication, policy; and
determining if a user is authentic based on the comparing; and
wherein the security conditions include the time of day of previous failed login attempts by a user.

* * * * *

UNITED STATES PATENT AND TRADEMARK OFFICE
CERTIFICATE OF CORRECTION

| | | |
|---|---|---|
| PATENT NO. | : 7,404,086 B2 | Page 1 of 1 |
| APPLICATION NO. | : 10/350003 | |
| DATED | : July 22, 2008 | |
| INVENTOR(S) | : Justin M. Sands, Christopher A. Sands and Arthur J. Sands | |

It is certified that error appears in the above-identified patent and that said Letters Patent is hereby corrected as shown below:

On the Title Page, item (73) Assignee, correct the following as follows:

-- Assignee: Advanced Biometric Controls, LLC, Herndon, VA (US) --

Signed and Sealed this
Fifth Day of April, 2011

David J. Kappos
*Director of the United States Patent and Trademark Office*